Figure 1:
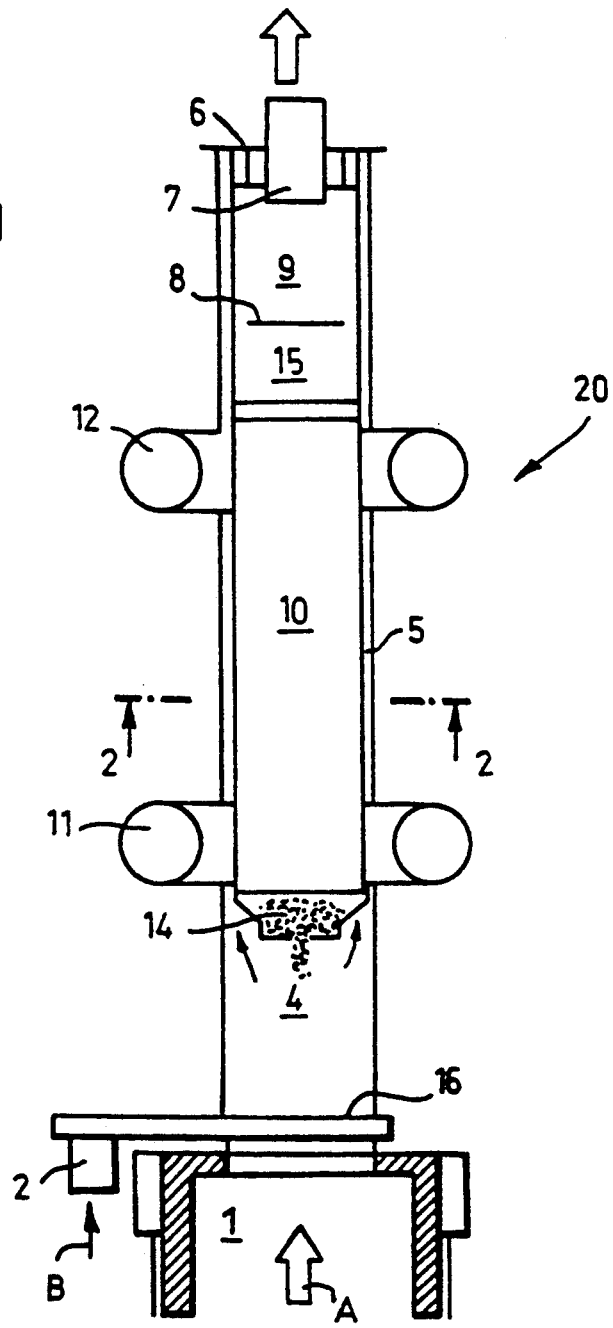

United States Patent [19]
Ruottu

[11] Patent Number: 5,282,506
[45] Date of Patent: Feb. 1, 1994

[54] PROCESS BASED ON CIRCULATING FLUIDIZED BED TECHNIQUE FOR COOLING GASES, AND A CIRCULATING FLUIDIZED BED COOLER USED IN THE PROCESS

[75] Inventor: Seppo Ruottu, Karhula, Finland
[73] Assignee: Tampella Power OY, Finland
[21] Appl. No.: 11,502
[22] Filed: Mar. 8, 1993

Related U.S. Application Data

[62] Division of Ser. No. 834,362, Feb. 12, 1992, Pat. No. 5,226,475.

[30] Foreign Application Priority Data

Feb. 14, 1991 [FI] Finland ................. 910731

[51] Int. Cl.$^5$ ................. F28C 3/16
[52] U.S. Cl. ................. 165/104.18; 165/104.16; 122/4 D
[58] Field of Search ............. 165/104.16, 104.18; 122/42

[56] References Cited

U.S. PATENT DOCUMENTS

| | | | |
|---|---|---|---|
| 2,698,171 | 12/1954 | Schoenmakers et al. | 165/104.18 |
| 2,967,693 | 1/1961 | Cunningham et al. | 165/104.18 |
| 4,165,717 | 8/1979 | Reh et al. | 122/4 R |
| 4,550,769 | 11/1985 | Bhojwani et al | 165/104.18 |
| 4,651,807 | 3/1987 | Newby | 165/104.18 |
| 4,770,237 | 9/1988 | Morin et al. | 165/104.18 |
| 4,776,388 | 10/1988 | Newby | 165/104.18 |
| 4,862,954 | 9/1989 | Hellio et al. | 165/104.18 |
| 5,117,770 | 6/1992 | Hassinen | 122/4 D |

FOREIGN PATENT DOCUMENTS

| | | |
|---|---|---|
| 64997 | 5/1983 | Finland . |
| 95193 | 6/1983 | Japan . |
| 881516 | 11/1981 | U.S.S.R. . |

*Primary Examiner*—Albert W. Davis, Jr.
*Attorney, Agent, or Firm*—Banner, Birch, McKie & Beckett

[57] ABSTRACT

The invention relates to a process for cooling gases using a circulating fluidized bed technique, wherein gas is conveyed through a fluidized bed formed by circulating fluidized bed material so that part of the circulating fluidized bed material is driven along with the gas flow and whereby the circulating fluidized bed material entrained in the gas flow is separated from the gas flow and returned into the fluidized bed, and wherein at least part of the cooling is carried out by cooling the circulating fluidized bed material stream to be returned. The process is characterized in that substantially the entire cooling is realized by cooling the circulating fluidized bed material stream to be returned in a heat exchanger (10) separate from the gas flow duct, in which event the cooling of the gas stream is effected by means of the circulating fluidized bed material stream returned to the fluidized bed and having a temperature lower than that of the fluidized bed.

5 Claims, 2 Drawing Sheets

PROCESS BASED ON CIRCULATING FLUIDIZED BED TECHNIQUE FOR COOLING GASES, AND A CIRCULATING FLUIDIZED BED COOLER USED IN THE PROCESS

This application is a division of application Ser. No. 07/834,362, filed Feb. 12, 1992 now U.S. Pat. No. 5,226,475.

The present invention relates to a process for cooling gases using a circulating fluidized bed technique, wherein gas is conveyed through a fluidized bed formed by circulating fluidized bed material so that part of the circulating fluidized bed material is driven along with the gas flow and whereby the circulating fluidized bed material entrained in the gas flow is separated from the gas flow and returned into the fluidized bed, and wherein at least part of the cooling is carried out by cooling the circulating fluidized bed material stream to be returned. The invention also relates to a circulating fluidized bed cooler for cooling gas, which comprises means for feeding the gas to be cooled into the cooler, a discharge duct for venting the cooled gas, particulate circulating fluidized bed material forming a fluidized bed in the lower portion of the cooler and flowing along with the gas to the discharge duct, at least one return duct for returning the circulating fluidized bed material to the fluidized bed, and at least one cooling member for cooling the gas stream and the circulating fluidized bed material.

The circulating fluidized bed technique is commonly implemented in combustion and gassing processes. The essential advantage of the circulating fluidized bed technique in comparison with other reaction types is an excellent material and heat transfer between the particles and the gas. By using a sufficient gas velocity, a nearly isothermic state is produced in the reactor. This essentially facilitates the managing of the combustion and gassing processes.

Also Finnish Patent Application No. 813717 describes an embodiment of the circulating fluidized bed technique in the recovery of heat from gases containing molten material and/or vapours. In the solution disclosed in this reference, the process gas is cooled by means of cooling members directly cooling the gas flow, and the circulating fluidized bed material entrained in the gas flow is returned to the fluidized bed, into a duct leading from the gas discharge duct to the side of the fluidized bed. This solution has the drawback that the regulation of the gas temperature, and particularly when one desires a certain discharge temperature, of the operation of the coolers located directly in the gas flow, is not sufficiently effective, and thus the operative range of the apparatus is rather narrow. Further, the cooling of the particles entrained in the gas flow in such a cooler is not sufficiently effective, wherefore they are returned to the fluidized bed relatively hot, which further impairs the operation of the apparatus.

From the point of view of the circulating fluidized bed cooler, it is essential that the circulating fluidized bed material flow can be regulated independently of the rated load of the apparatus. Further, in many processes it is desirable that the temperature of the reactor remains constant within a wide load range. This is of particular importance in embodiments in which the chemical kinetics requires operation in a narrow temperature range. With the known implementations of the circulating fluidized bed technique, this is not possible.

It is known per se to cool the return circulation of a recycling particle stream. For instance in U.S. Pat. No. 4,165,717, a separate heat exchanger based on a bubbling fluidized bed technique has been used in the return circulation. Then e.g. a separate fluidizing gas stream must be used, which has a disadvantageous effect on the operation of the cyclone. Also, the solution is complicated to realize in practice, and its process regulation is difficult to manage. In some cases, it has been practical in other respects to construct the return duct to be cooled, in which case usually a small extent of the cooling has been effected in the return duct. These solutions are both complicated and difficult to realize, and also their controllability is rather low and their range of operation narrow.

The object of the present invention is to provide a process and a circulating fluidized bed cooler wherein the exhaust temperature of the gas stream to be treated can be regulated within wide limits independently of the load on the apparatus. The process of the invention is characterized in that substantially the entire cooling is realized by cooling the circulating fluidized bed material stream to be returned in a heat exchanger separate from the gas flow duct by means of a cooling medium separate from the circulating fluidized bed material, in which event the cooling of the gas stream is effected by means of a circulating fluidized bed material stream returned to the fluidized bed and having a temperature lower than that of the fluidized bed. The circulating fluidized bed cooler of the invention is characterized in that it comprises one heat exchanger serving as a cooling member, through which a cooling medium is conveyed, that all return ducts for returning the circulating fluidized bed material to the fluidized bed lead through the heat exchanger so that the returned circulating fluidized bed material is cooled in the heat exchanger separately from the cooling medium, that a closure space with an aperture is provided below the cooler, in which closure space the returned circulating fluidized bed material continually forms a plug-like layer, thus preventing the flow of gas through the return ducts into the gas exhaust duct.

The essential feature of the cooling method of the present invention is that the majority of the gas cooling (preferably 80–100% of the total cooling) is effected by cooling the solids in a cooler disposed substantially vertically in the return duct for solids, the solids flowing freely through said cooler on the action of gravitational acceleration, and by cooling the gas by means of the cooled returned solids. This object is achieved in such a way that the majority of the cooling surfaces are disposed in the solids return stream of the circulating fluidized bed cooler, in which event the gas to be cooled is substantially not in contact with the cooling surfaces, but the cooling of the gas is effected by mixing the particles that have cooled in the heat exchanger connected to the circulating fluidized bed material return duct with the gas to be treated. In accordance with the invention, the heat exchanger preferably has a number of return ducts or tubes, via which the circulating fluidized bed material, such as sand, can flow through the heat exchanger downwardly, the heat exchanger serving as a cooling member as air or some other suitable medium flows therethrough via the adjacent ducts, said medium being passed in the exterior of the return ducts, cooling their walls and thereby also the circulating fluidized bed material to be returned, such as sand, simultaneously being warmed up itself. An advantage of the process according to the present invention is that the regulation of the cooling efficiency is easy and simple to perform, since the cooling is mainly conducted indirectly by cooling the circulating fluidized bed material, and at the most a small extent of the cooling is performed directly in such a way that the process gas flows along the heat-conducting outer surface of the cooler.

Figure 2:
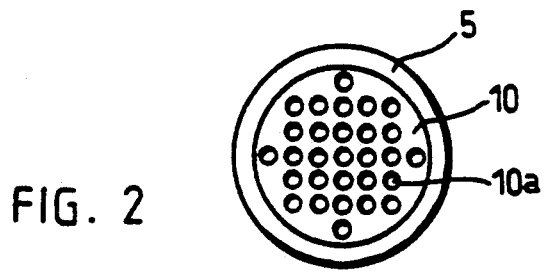
Figure 3:
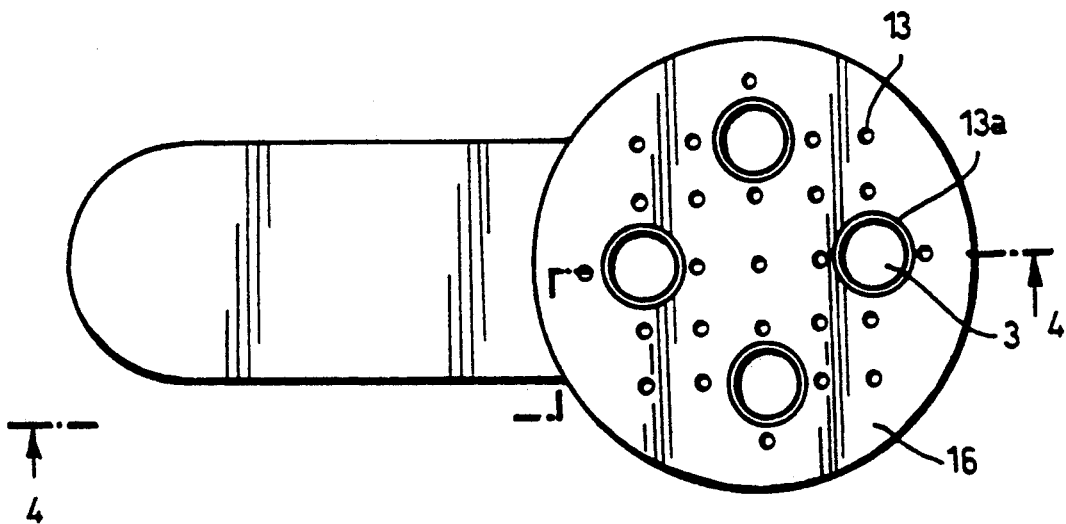
Figure 4:
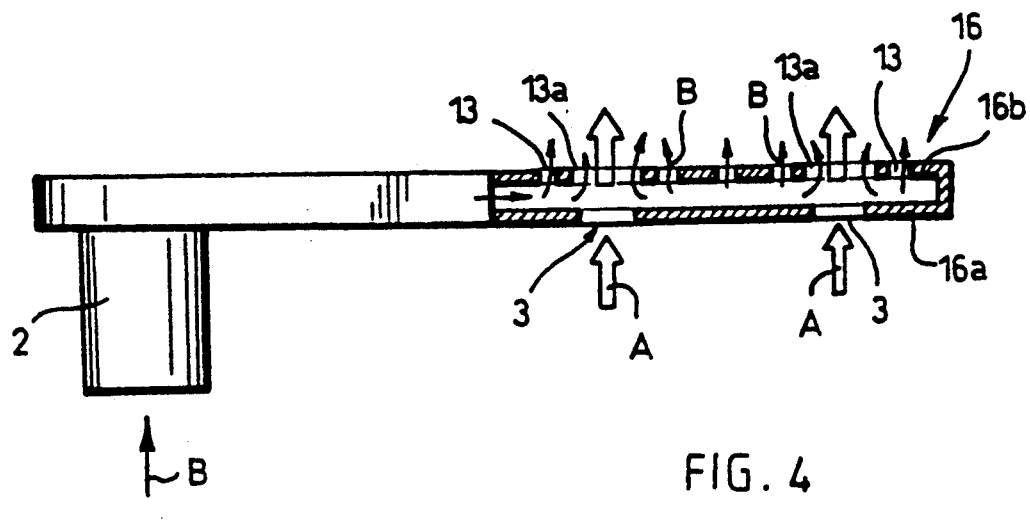

In the following, the invention will be explained in more detail with reference to the accompanying drawings, wherein FIG. 1 shows the principle of the construction and the operation of the circulating fluidized bed cooler of the invention, FIG. 2 shows a cross-section of the circulating fluidized bed cooler of FIG. 1 along line 2—2, and FIGS. 3 and 4 show in more detail the construction and mode of operation of the jetting bottom of the circulating fluidized bed cooler.

FIG. 1 shows a circulating fluidized bed cooler according to the invention, and generally indicated by the reference numeral 20. It comprises a hot gas reactor 1, wherefrom the gas to be cooled is conducted to the circulating fluidized bed cooler. Reference numeral 2 denotes a recycle gas grate including fluidizing nozzles 13 and 13a (to be explained hereinbelow), wherefrom the recycle gas is conducted to the fluidized bed. The recycle gas grate 2 also includes hot gas nozzles indicated with reference numeral 3. The lower portion of the circulating fluidized bed cooler, 20 i.e. the fluidized bed chamber, has been indicated with reference numeral 4. To ensure a sufficient particle concentration, the cross-section of the lower portion 4 is greater than that of the annular upper portion, that is, of the reaction chamber 5 through which the gas and particles flow into the upper portion of the circulating fluidized bed cooler.

From the annular reaction chamber 5, the gases and the circulating fluidized bed material particles are conveyed tangentially to a cyclone chamber 9 through a cyclone vane grate 6 disposed axial-symmetrically in the upper portion of the circulating fluidized bed cooler. The gas substantially purified of particles is discharged through the central tube of the cyclone, i.e. exhaust tube 7, for further processing. An intermediate floor disposed within the cyclone has been indicated with reference numeral 8, which separates the cyclone chamber 9 and the particle distribution chamber 15 therebelow. The purpose of the distribution chamber is to distribute the particle stream migrating into the return circulation, i.e. to be returned to the fluidized bed, evenly between the return ducts or tubes of the typically recuperative heat exchanger 10. A nozzle piece 14 has been installed in the apparatus to form a closure chamber in which the circulating fluidized bed material returned through the heat exchanger 10 forms a plug-like layer, flowing evenly through the aperture at the centre of the nozzle piece 14 into the fluidized bed chamber 4. This is intended for preventing the flow of gas upwardly through the heat exchanger 10. The inlet passage for the cooling stream of gas or other medium into the heat exchanger 10 has been indicated with reference numeral 11, and the outlet passage of said stream out from the heat exchanger has been indicated with reference numeral 12. The stream of cooling medium passes through the heat exchanger in the exterior of the return ducts, cooling the ducts and thereby the particle stream contained therein, simultaneously being warmed up itself.

FIG. 2 is a schematic cross-sectional view of the circulating fluidized bed cooler 20 of FIG. 1 cross-cut along line 2—2. FIG. 2 shows an annular reaction chamber 5 at the centre of which a recuperative cooler 10 has been disposed substantially symmetrically. Return ducts 10a extending from the chamber 15 up to the space of the nozzle piece 14 lead through the cooler 10. A cooling medium, which may be air, some other suitable gas, water, some other liquid or steam depending on the application used, flows in the exterior of the ducts 10a.

EXAMPLE

|  | Example | |
|---|---|---|
|  | Inlet | Outlet |
| Hot gas | | |
| Temperature | 960° C. | 480° C. |
| Pressure | 1.1 MPa | 1.0 MPa |
| Gas stream | 86.8 mol/s | 86.8 mol/s |
| Stream of $Na_2S$ | 0.37 mol/s | 0.37 mol/s |
| Stream of $Na_2CO_3$ | 0.88 mol/s | 0.88 mol/s |
| Cooling air | | |
| Temperature | 290° C. | 416° C. |
| Pressure | 1.3 MPa | 1.2 MPa |
| Gas stream | 5410 mol/s | 5410 mol/s |

The particle concentration in the lower portion of the circulating fluidized bed cooler is preferably 50–150 $kg/m^3$, and in the upper portion 5–30 $kg/m^3$. By using a recycle material having a suitable size distribution, the particle density profile can be adjusted within said percentage limits independently of the gas stream. A typical gas velocity affording an apparatus-technically practical construction varies in the range 3–8 m/s. If the particle size distribution of the recycle material cannot be selected, one must in certain cases use considerably higher velocities, even up to 30 m/s.

In accordance with the invention, a sufficient circulating fluidized bed material stream is maintained by means of a recycle gas which is conveyed into the circulating fluidized bed cooler through a separate jetting bottom 16 shown in FIGS. 3 and 4 from nozzles 13 so that it maintains the zone between the hot gas nozzles 3 in a fluidized state. FIG. 4 shows a jetting bottom according to FIG. 3 cut open along the line 4—4, showing the jetting bottom construction of the invention and its operation. In accordance with the present invention, the circulating fluidized bed cooler thus advantageously has a double jetting bottom wherein the hot gas to be cooled is conveyed into the cooler through nozzles 3 preferably of a relatively large size (D=20–60 mm), and the recycle gas is conveyed through conventional smaller nozzles 13. Further, the fluidizing gas is conveyed through nozzle apertures 3, which are provided in the lower plate 16a of the double jetting bottom 16 and which convey process gas, about the incoming stream of process gas in such a way that the upper jetting bottom 16b above the process gas apertures 3 has apertures 13a of a larger diameter than apertures 3 at the location of said process gas apertures, so that the fluidizing gas B issuing through duct 2 flows between the lower and upper jetting bottom 16a and 16b and is pushed about the process gas flow A into an annular form, in addition to its flowing through the apertures of the nozzles. With this arrangement, one can avoid incrustation about the nozzles for hot gas, which otherwise often presents a problem if the hot gas contains condensing compounds or, on account of its high temperature, tends to melt the fluidized bed material about the nozzles.

In certain cases, it has been practical to add to or maintain a high particle concentration only in a shallow zone above the jetting bottom. In that event, one can for instance prevent the formation of collars about the hot gas nozzles without increasing the solids stream passing through the cooler. Also molten and condensing material which is possibly present can then be collected substantially about said coarse material. The circulating fluidized bed material stream is maintained by means of a more finely divided particulate material. By regulating the recycle gas flow, one can regulate the material stream through the heat exchanger connected to the circulating fluidized bed material stream, in which situation also the heat exchanging capacity of the cooler is regulated. Since upon the diminishing of the recycle gas flow a considerable portion of the particles remain in the fluidized state on the nozzle bottom of the cooler, the influence of the regulation of the recycle gas flow is rapid and effective. Another way to regulate the heat exchanging effect is to add or diminish the amount of circulating fluidized bed material in the cooler.

In the foregoing description and drawings, the invention has been explained only by way of example, and it is in no way restricted to said example.

I claim:

1. A circulating fluidized bed cooler for cooling gas, comprising:
   feeding means for feeding the gas to be cooled into the cooler, the feeding means including a jetting bottom having separate recycle gas nozzles for feeding recycle gas into the cooler and separate hot gas nozzles for feeding hot gas to be cooled into the cooler,
   a discharge duct for venting the cooled gas, particulate circulating fluidized bed material forming a fluidized bed in the lower portion of the cooler and flowing along with the gas to the discharge duct,
   at least one return duct for returning the circulating fluidized bed material to the fluidized bed,
   a heat exchanger through which a cooling medium is conveyed, all return ducts for returning the circulating fluidized bed material to the fluidized bed leading through the heat exchanger so that the returned circulating fluidized bed material is cooled in the heat exchanger separately from the cooling medium, and
   a closure space with an aperture being provided below the cooler, in which closure space the returned circulating fluidized bed material continually forms a plug-like layer, thus preventing the flow of gas through the return ducts into the gas exhaust duct.

2. A cooler as claimed in claim 1, further comprising a cyclone chamber provided in the upper end thereof for separating the circulating fluidized bed material from the gas, the gas exhaust duct being disposed essentially at the centre of the cyclone chamber, a circulating fluidized bed material distribution chamber provided below the cyclone chamber, an intermediate floor between the cyclone chamber and the distribution chamber, the heat exchanger being disposed below the distribution chamber.

3. A cooler as claimed in claim 2 wherein the cooler has a circular cross-section and the cyclone chamber and the heat exchanger are disposed rotation-symmetrically within the cooler so that substantially annular flow duct for the gas to be cooled is formed about thee heat exchanger, whereby the circulating fluidized bed material returns through the heat exchanger substantially to the centre of the fluidized bed in the lower portion of the cooler.

4. A cooler as claimed in claim 3 wherein the closure space at the lower end of the heat exchanger comprises a throttle cone disposed substantially symmetrically with the heat exchanger.

5. A cooler as claimed in claim 1, wherein the jetting bottom includes ducts for feeding an annular recycle gas flow about the hot gas flows issuing from the hot gas nozzles.

* * * * *